UNITED STATES PATENT OFFICE.

BRUNO RICHARD SEIFERT, OF RADEBEUL, NEAR DRESDEN, GERMANY, ASSIGNOR TO DR. F. VON HEYDEN NACHFOLGER, OF SAME PLACE.

PROCESS OF MAKING OXYUVITIC ACID.

SPECIFICATION forming part of Letters Patent No. 488,290, dated December 20, 1892.

Application filed May 12, 1892. Serial No. 432,719. (Specimens.)

*To all whom it may concern:*

Be it known that I, BRUNO RICHARD SEIFERT, of Radebeul, near Dresden, in the Kingdom of Saxony, German Empire, have invented certain new and useful Improvements in the Manufacture of Alpha-Oxyuvitic Acid, of which the following is a specification.

It has not heretofore been possible to manufacture alpha oxyuvitic acid on a large or commercial scale. This acid has been obtained in chemical laboratories from amido uvitic acid with the aid of nitrous acid and from sulphouvitic acid with the alkali melt. I have now discovered that this acid can be easily prepared on a large scale by causing carbonic acid to act upon alkaline or earthy alkaline combinations of ortho cresol at temperatures of not less than 160° centigrade. At temperatures under 160° centigrade ortho cresol mono carbon acid $C_6 H_3 \underset{1}{CH_3} \underset{2}{OH} \underset{3}{COOH}$ is formed as already known, but at temperatures over 160° centigrade a mixture of this acid with alpha uvitic acid $C_6 H_3 \underset{1}{CH_3} \underset{2}{OH} \underset{3}{COOH} \underset{5}{COOH}$ is obtained while at temperatures above 210° the latter only is obtained.

The process is conducted with good results by proceeding as next hereinafter described, but the invention is not limited as to details.

Dry carbonic acid is pressed or forced to saturation into dry cresolate of potash heated to about 220° centigrade in a vessel capable of withstanding pressure. The materials are then allowed to cool and the product of the reaction is dissolved in water. By means of hydrochloric acid alpha oxyuvitic acid, the melting point of which is about 290° centigrade, can be precipitated from the solution. This product may be purified from any cresotinic acid that may be mixed with it by partial precipitation of the solution of a salt of the acid.

In this process the ortho cresolate of potash may be replaced by another alkaline or earthy alkaline salt of ortho cresol. By saturating the heated cresol salt with carbonic acid at atmospheric pressure instead of in a closed vessel as hereinbefore described, a smaller yield of oxyuvitic acid is obtained.

The acid manufactured according to this invention is useful in the manufacture of dyes or coloring matters.

What I claim as my invention is:

The process of making alpha oxyuvitic acid which consists in subjecting alkaline or earthy alkaline salts of cresol to the action of carbonic acid at a temperature of about from 160° to 220° centigrade, substantially as herein described.

In testimony that I claim the foregoing as my invention I have signed my name in presence of two subscribing witnesses.

BRUNO RICHARD SEIFERT.

Witnesses:
 PAUL ARRAS,
 WILHELM WIESENHÜTTER.